(12) United States Patent
Nakajo

(10) Patent No.: US 7,621,399 B2
(45) Date of Patent: Nov. 24, 2009

(54) CASSETTE

(75) Inventor: Masakazu Nakajo, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 660 days.

(21) Appl. No.: 11/386,795

(22) Filed: Mar. 23, 2006

(65) Prior Publication Data

US 2006/0213798 A1 Sep. 28, 2006

(30) Foreign Application Priority Data

Mar. 23, 2005 (JP) .............................. 2005-084578

(51) Int. Cl.
*G03B 42/04* (2006.01)

(52) U.S. Cl. .................. 206/455; 206/1.5; 378/188

(58) Field of Classification Search ................ 206/449, 206/455, 387.12, 1.5, 456; 220/345.1, 345.2, 220/345.3, 348, 351; 378/182, 188
See application file for complete search history.

(56) References Cited

U.S. PATENT DOCUMENTS

| | | | | | |
|---|---|---|---|---|---|
| 4,219,116 | A | * | 8/1980 | Borkan ...................... 206/1.5 |
| 4,561,544 | A | * | 12/1985 | Reeve ........................ 206/540 |
| 4,592,600 | A | * | 6/1986 | Bohnet et al. .............. 312/9.41 |
| 4,702,372 | A | * | 10/1987 | Ackeret ................. 206/387.12 |
| 4,889,233 | A | * | 12/1989 | Torii .......................... 206/455 |
| 5,038,932 | A | * | 8/1991 | Sheu ........................ 206/387.1 |
| 5,082,137 | A | * | 1/1992 | Weinstein ................ 220/345.3 |
| 5,454,932 | A | * | 10/1995 | Tardif et al. ............... 206/387.1 |
| 5,475,230 | A | * | 12/1995 | Stumpf et al. ............. 250/484.4 |
| 5,524,752 | A | * | 6/1996 | Mazzucchelli ........... 206/308.2 |
| 5,823,341 | A | * | 10/1998 | Nakasuji ................ 206/387.11 |
| 5,912,944 | A | * | 6/1999 | Budinski et al. ............ 378/182 |
| 6,068,439 | A | * | 5/2000 | Ohta .......................... 414/411 |
| 6,557,705 | B1 | * | 5/2003 | Nakajo et al. ............... 206/455 |
| 6,669,363 | B2 | * | 12/2003 | Nakajo ....................... 378/182 |
| 6,719,457 | B2 | * | 4/2004 | Nakajo ....................... 378/188 |
| 6,814,225 | B2 | * | 11/2004 | Belden et al. ................ 206/1.5 |
| 7,198,149 | B2 | * | 4/2007 | Gelardi ....................... 206/1.5 |
| 7,331,710 | B2 | * | 2/2008 | Nakajo ....................... 378/188 |

FOREIGN PATENT DOCUMENTS

JP 11-271894 A 10/1999

* cited by examiner

*Primary Examiner*—David T Fidei
(74) *Attorney, Agent, or Firm*—Sughrue Mion, PLLC

(57) ABSTRACT

A cassette has a housing with a stimulable phosphor sheet stored therein, a lid mounted on an end of the housing, and an opening/closing lock mechanism mounted in the housing for locking the lid against opening and closing movement. The stimulable phosphor sheet stored in the housing is locked against displacement by a lock mechanism mounted in the housing. When the opening/closing lock mechanism is actuated to open the lid and the lock mechanism is actuated to unlock the stimulable phosphor sheet, the stimulable phosphor sheet can be removed from the housing.

15 Claims, 9 Drawing Sheets

CASSETTE

BACKGROUND OF THE INVENTION

1. Field of the Invention

The present invention relates to a cassette for housing a sheet-like workpiece therein.

2. Description of the Related Art

There are known systems for recording radiation image information of a subject such as a human body on a stimulable phosphor (photo-simulated emission phosphor) and either reproducing the recorded radiation image information on a photosensitive medium such as a photographic film or the like, or outputting the recorded radiation image information as a visible image on a CRT or the like.

The stimulable phosphor is a phosphor which, when exposed to an applied radiation (X-rays, $\alpha$-rays, $\beta$-rays, $\gamma$-rays, electron beams, ultraviolet radiation, or the like), stores a part of the energy of the radiation, and, when subsequently exposed to applied stimulating rays such as visible light, emits light in proportion to the stored energy of the radiation. The stimulable phosphor is usually arranged in the form of a sheet for use as a stimulable phosphor sheet.

It has been customary to apply a radiation, e.g., X-rays, to a subject such as a human body or the like and record the radiation image information of the subject directly on a photographic film. A radiation image recording medium such as a stimulable phosphor sheet, a photographic sheet, or the like is normally housed in a cassette loaded in a photographic device, and X-rays are applied to the radiation image recording medium through the cassette. For reading the radiation image information recorded on a stimulable phosphor sheet, for example, the cassette is loaded into an image reading apparatus. Then, stimulating light is applied to the stimulable phosphor sheet, and light emitted from the stimulable phosphor sheet and representing the stored radiation energy is photoelectrically read and converted into an electric signal.

Japanese Laid-Open Patent Publication No. 11-271894 discloses a cassette comprising a casing and a lid that is openably and closably mounted on the casing for removing a stimulable phosphor sheet from the casing and storing the stimulable phosphor sheet back into the casing.

The casing accommodates therein a pair of lock mechanisms respectively disposed with a certain distance from the center of the front face thereof for locking the lid against opening and closing movement. The lid can be opened when it is unlocked by a pair of unlock functions mounted on a front face of the casing.

When a portion of the casing, particularly, an end of the casing, is opened, the casing provides a large open area. Because of the large open area, the casing as it is open is not sufficiently rigid and is not fully shielded against light which tends to enter the casing through the open area.

In addition, inasmuch as the lock mechanisms for locking the lid against opening and closing movement are disposed with a certain distance from the center of the front face of the casing, the lid is not locked against movement substantially centrally in the casing, and such a cassette is likely to suffer a lack of strength when the lid is closed.

Some cassettes have an openable and closable lid which is provided by an entire side panel of the casing, rather than by only a portion of the casing. With such a cassette, since a large space is required to open and close the lid, an image reading apparatus for reading recorded radiation image information from the stimulable phosphor sheet stored in the cassette is liable to large in size due to the large space required to open and close the lid.

SUMMARY OF THE INVENTION

It is a general object of the present invention to provide a cassette which is of a simple construction, has a desired level of mechanical strength, and is capable of holding a radiation image recording medium reliably in a housing thereof.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
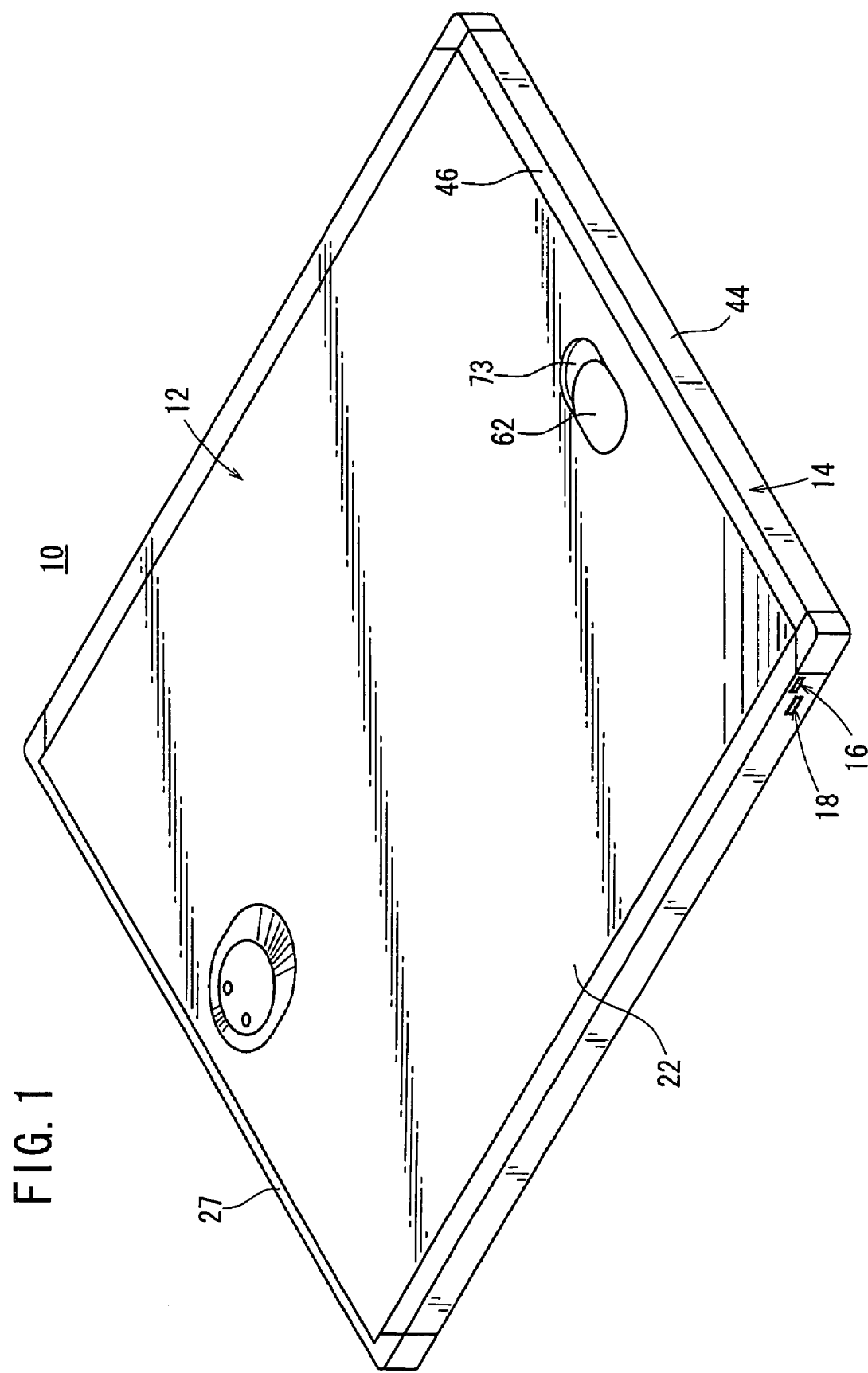
FIG. 1 is a perspective view of a cassette according to an embodiment of the present invention.

FIG. 1 shows in perspective a cassette 10 according to an embodiment of the present invention.

Figure 2:
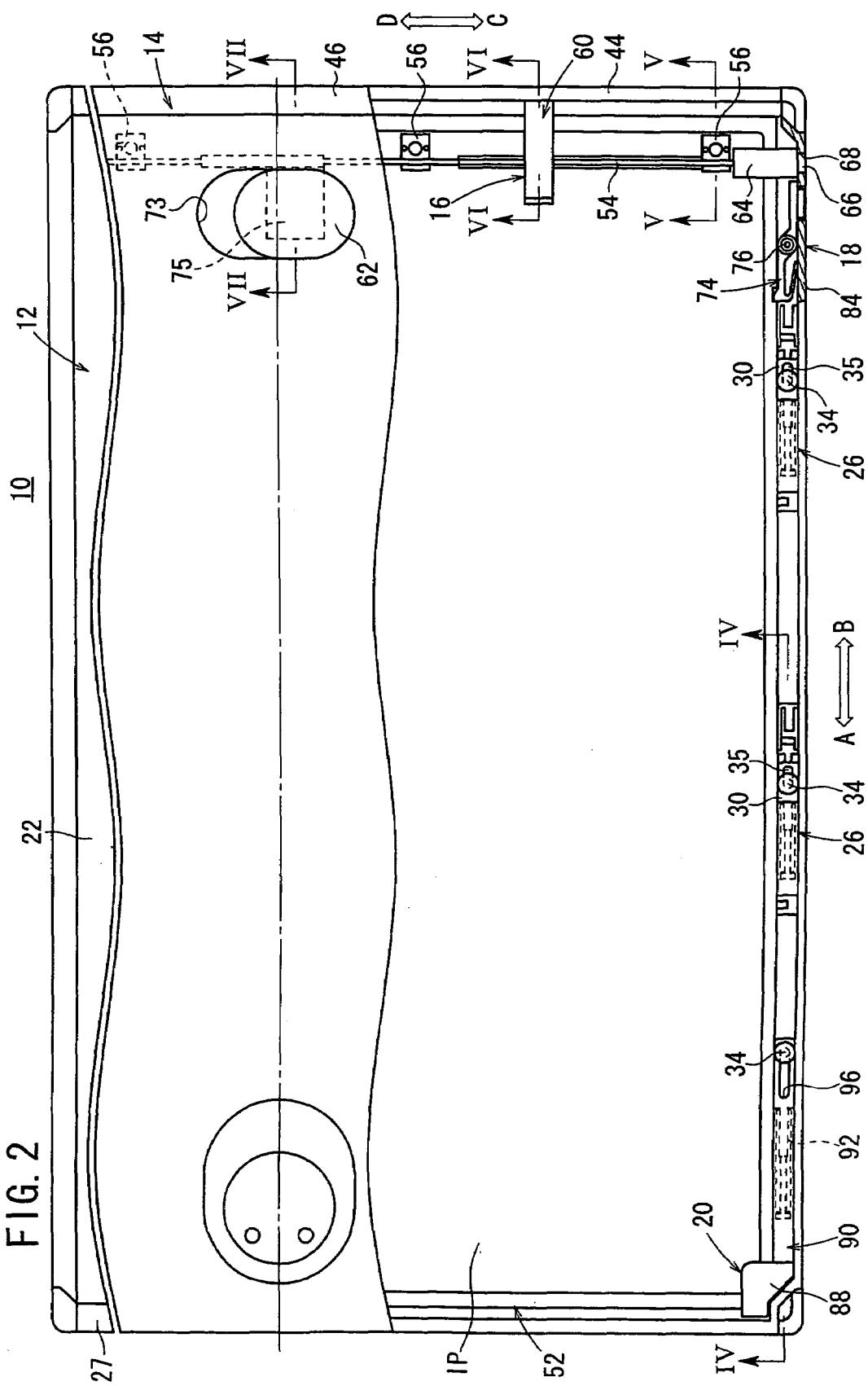
FIG. 2 is a fragmentary horizontal cross-sectional view of the cassette shown in FIG. 1.
Figure 3:
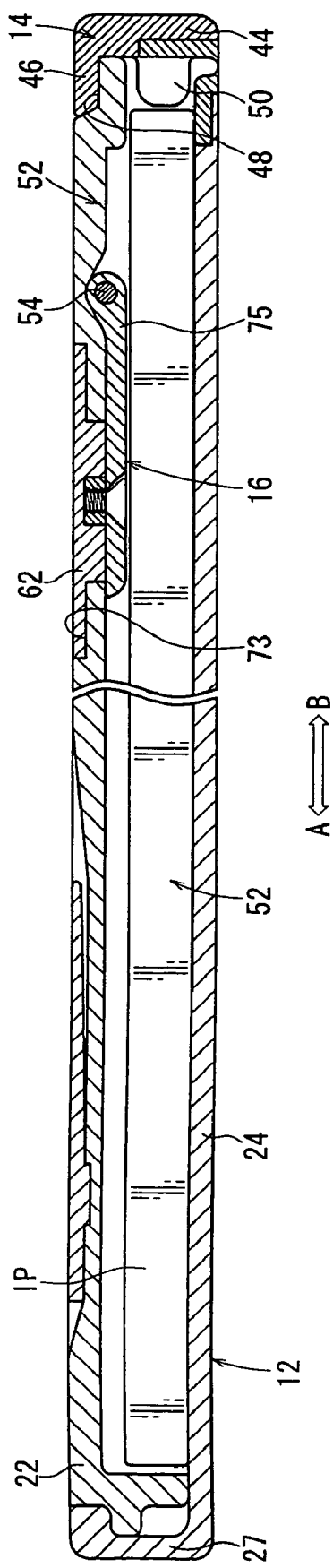
FIG. 3 is a fragmentary vertical cross-sectional view of the cassette shown in FIG. 1.

As shown in FIGS. 1 through 3, the cassette 10 comprises a box-shaped housing 12 housing a stimulable phosphor sheet IP therein and providing an irradiated surface, a lid 14 mounted on an open end of the housing 12, the lid 14 being openable and closable when the stimulable phosphor sheet IP is stored in or removed out of the housing 12, an opening/closing lock mechanism (lid lock mechanism) 16 for locking the lid 14 against opening and closing movement, a lock mechanism (switching mechanism) 18 for switching the stimulable phosphor sheet IP into and out of fixed engagement with the housing 12, and a pair of pusher mechanisms 20 for pushing the stimulable phosphor sheet IP toward the lid 14.

The housing 12 comprises first and second casings 22, 24 made of a synthetic resin material which are of substantially the same shape as each other, an assembling mechanism 26 for assembling the first casing (plate) 22 and the second casing (plate) 24 in spaced-apart confronting relation to each other, and a holder 27 securing respective ends of the first and second casings 22, 24 integrally to each other.

Figure 4:
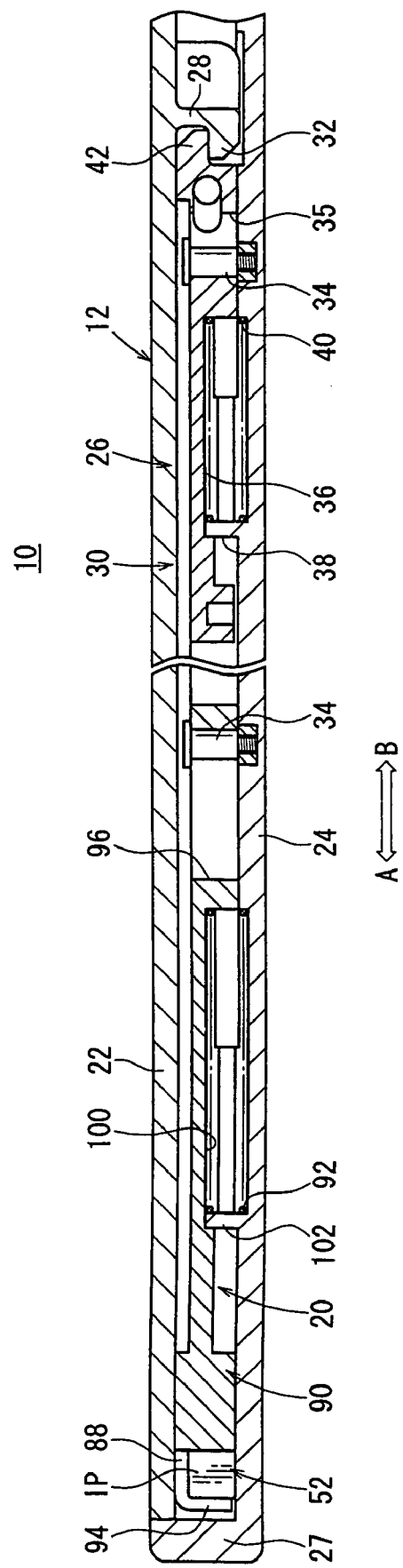
FIG. 4 is a cross-sectional view taken along line IV-IV of FIG. 2.

As shown in FIGS. 2 and 4, the assembling mechanism 26 comprises a plurality of arms 28 disposed on a peripheral edge of the first casing 22 and projecting substantially perpendicularly therefrom toward the second casing 24, and a plurality of engagement blocks (displacement members) 30

(see FIG. 4) disposed on the second casing 24 so as to face the second arms 28 when the first and second casings 22, 24 are assembled together.

The arms 28 have respective teeth 32 bent from ends thereof substantially parallel to the first casing 22 toward the holder 27 in the direction indicated by the arrow A.

The engagement blocks 30 are disposed between an inner surface of the second casing 24 and a plate member 52 including the stimulable phosphor sheet IP. The engagement blocks 30 have respective oblong holes 35 defined therein, which receive respective pins 34 fixed to the second casing 24, so that the engagement blocks 30 are guided by the pins 34 for axial displacement. The engagement blocks 30 also have respective downwardly open recesses 36 defined therein which house springs 40 interposed between the engagement blocks 30 and vertical walls 38 of the second casing 24. The engagement blocks 30 are normally biased to move toward the arms 28 in the direction indicated by the arrow B under the resiliency of the springs 40.

The engagement blocks 30 have respective fingers 42 on their ends that are closer to the lid 14 in the direction indicated by the arrow B, the fingers 42 projecting a predetermined distance from the ends. The teeth 32 of the arms 28 are engaged between the fingers 42 and the second casing 24. As a result, the first and second casings 22, 24 vertically engage each other and are integrally assembled together.

The first and second casings 22, 24 that are assembled together by the assembling mechanism 26 have respective ends closed by the holder 27 and respective other ends closed by the lid 14. In this manner, the housing 12 which is constructed of the first and second casings 22, 24 can be assembled with ease.

As shown in FIG. 2, the lid 14 has a longitudinal direction which is essentially the same as the width of the housing 12. The lid 14 has such a height that, when the lid 14 closes the end of the housing 12 which is remote from the holder 27, the lid 14 has upper and lower surfaces lying substantially flush with the upper and lower surfaces of the first and second casings 22, 24 (see FIG. 3).

The lid 14 is made of a flexible resin material and has a substantially L-shaped cross section. The lid 14 has a base 44 extending substantially perpendicularly to the first and second casings 22, 24 and joined to the end of the second casing 24. Stated otherwise, the lid 14 is integrally coupled to the second casing 24, which is also made of a resin material. The lid 14 is angularly movable with respect to the second casing 24 about the junction where the lid 14 and the second casing 24 are joined to each other.

Figure 5:
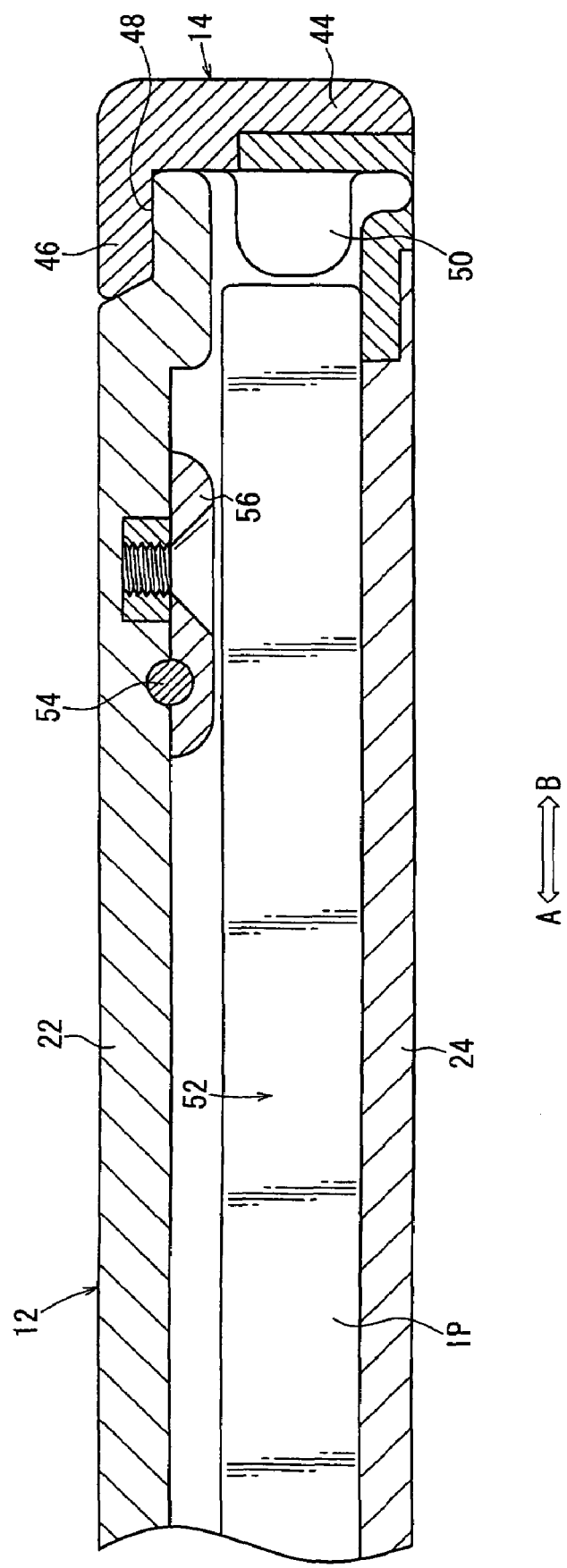
FIG. 5 is a cross-sectional view taken along line V-V of FIG. 2.

The lid 14 also has a lip 46 bent substantially perpendicularly from the base 44 and extending a predetermined distance toward the housing 12 in the direction indicated by the arrow A. When the lid 14 closes the open end of the housing 12, the lip 46 engages a step 48 of the first casing 22 (see FIGS. 3 and 5). The step 48 is displaced toward the second casing 24 by a distance which is substantially the same as the thickness of the lip 46. Therefore, when the lid 14 closes the open end of the housing 12, the lip 46 does not project from the surface of the first casing 22, but lies substantially flush with the first casing 22.

The base 44 has a boss 50 projecting substantially centrally therefrom a predetermined distance toward the housing 12 in the direction indicated by the arrow A. When the lid 14 closes the open end of the housing 12, the boss 50 is inserted between the first and second casings 22, 24 to a small extent. Specifically, the boss 50 is disposed in a position facing the stimulable phosphor sheet IP that is housed in the housing 12.

The stimulable phosphor sheet IP is preferably made of a rigid sheet comprising a support base made of a hard material such as glass or the like and a rectangular phosphor layer disposed on the support base and providing a radiation image information recording area. The phosphor layer is preferably formed on the support base by evaporating a columnar stimulable phosphor on the support base. Specifically, the phosphor layer can be formed on the support base by a vacuum deposition method, in which evaporating the stimulable phosphor with heat in a vacuum container and applying the evaporated stimulable phosphor to the support base, a sputtering method, a CVD method, or an ion-plating method.

The phosphor layer comprises a multiplicity of optically independent columnar bodies of phosphor extending perpendicularly to the plane of the phosphor layer. The phosphor layer is highly sensitive to applied radiations, can reduce the granularity of images produced therefrom, and can reduce scattering of stimulating light for producing clear images.

The stimulable phosphor sheet IP is held by the plate member 52 which has a predetermined thickness. The plate member 52 is in the form of a substantially elongate rectangle that is slightly greater than the stimulable phosphor sheet IP, and holds the stimulable phosphor sheet IP substantially centrally therein (see FIG. 2).

As shown in FIG. 2, the opening/closing lock mechanism 16 is disposed in the housing 12 near the lid 14. The opening/closing lock mechanism 16 comprises an axially displaceable shaft 54 extending substantially parallel to the lid 14, a plurality of, e.g., four, guides 56 fixed at equally spaced intervals to an inner wall surface of the first casing 22 and supporting the shaft 54 for axial displacement, a pair of engagement plates (engagement members) 60 mounted on the shaft 54 and engaging in respective engagement grooves (grooves) 58 defined in the lid 14, and an unlocking member (operating member) 62 for displacing the shaft 54 to release the lid 14 out of locked engagement with the engagement plates 60.

The shaft 54 is of an elongate shape extending from one side to the other of the housing 12. The shaft 54 extends through the guides 56 spaced at equal intervals along the axis of the shaft 54 and also through the first casing 22, and are supported by the guides 56 and the first casing 22. The shaft 54 is held by the guides 56 for axial displacement with respect to the first casing 22.

Figure 8:
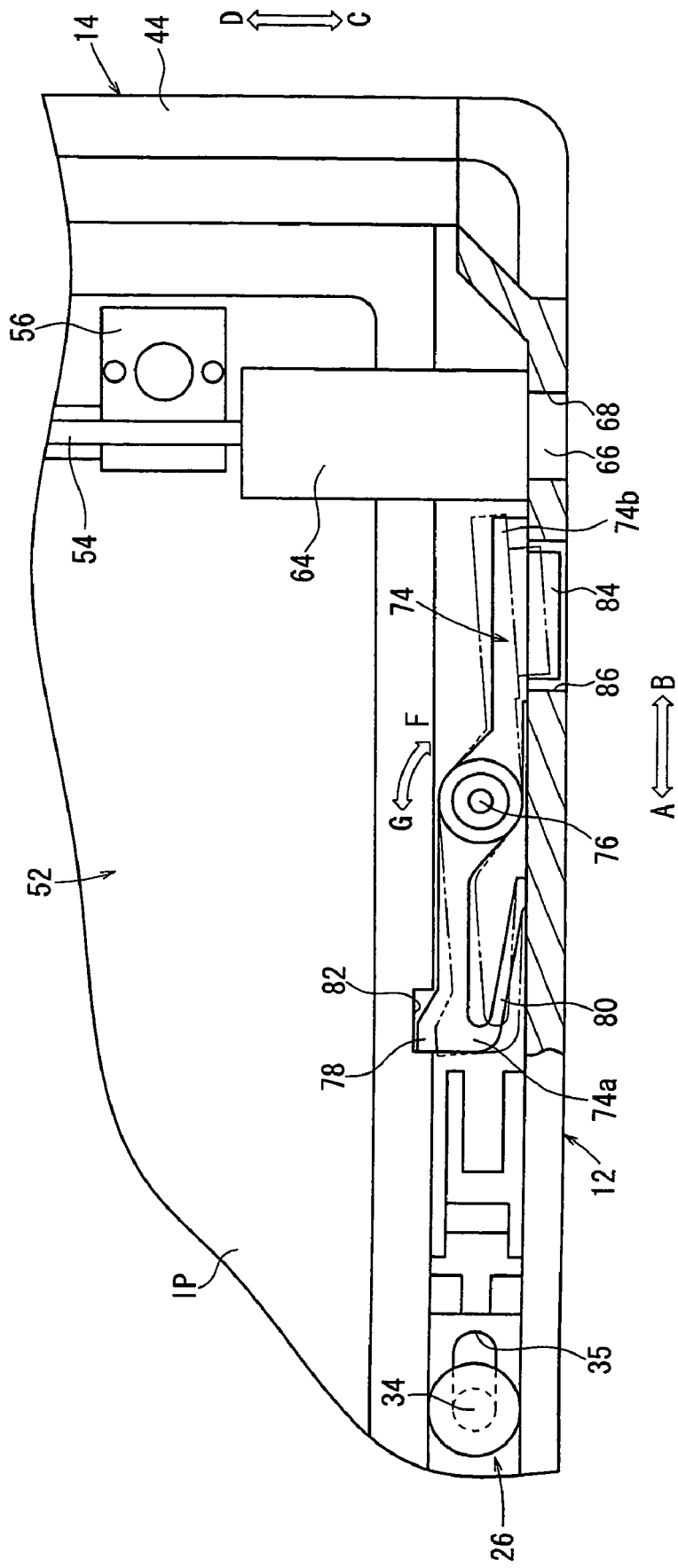
FIG. 8 is an enlarged fragmentary horizontal cross-sectional view of a lock mechanism and nearby parts of the cassette shown in FIG. 2.

A presser 64 is mounted on an end of the shaft 54 in the housing 12. The presser 64 has a first pressing member 66 having a substantially elongate rectangular cross section and projecting on one side surface of the housing 12 in the direction indicated by the arrow C. As shown in FIG. 8, the first pressing member 66 is inserted in a first hole 68 defined in the housing 12 complementarily in shape to the first pressing member 66, and has an outer end exposed through the first hole 68 out of the housing 12. The outer end of the first pressing member 66 does not project from the side surface of the housing 12, but lies substantially flush with the side surface of the housing 12.

When the first pressing member 66 is pressed into the housing 12 in the direction indicated by the arrow D by a pressing mechanism (not shown) outside of the housing 12, the presser 64 axially displaces the shaft 54 away from the first hole 68 in the direction indicated by the arrow D.

As shown in FIG. 2, each of the engagement plates 60 is disposed between adjacent two of the guides 56, and is integrally fixed to the shaft 54. Therefore, the engagement plates 60 are displaced in unison with the shaft 54 along the axis thereof when the shaft 54 is axially displaced.

Figure 6:
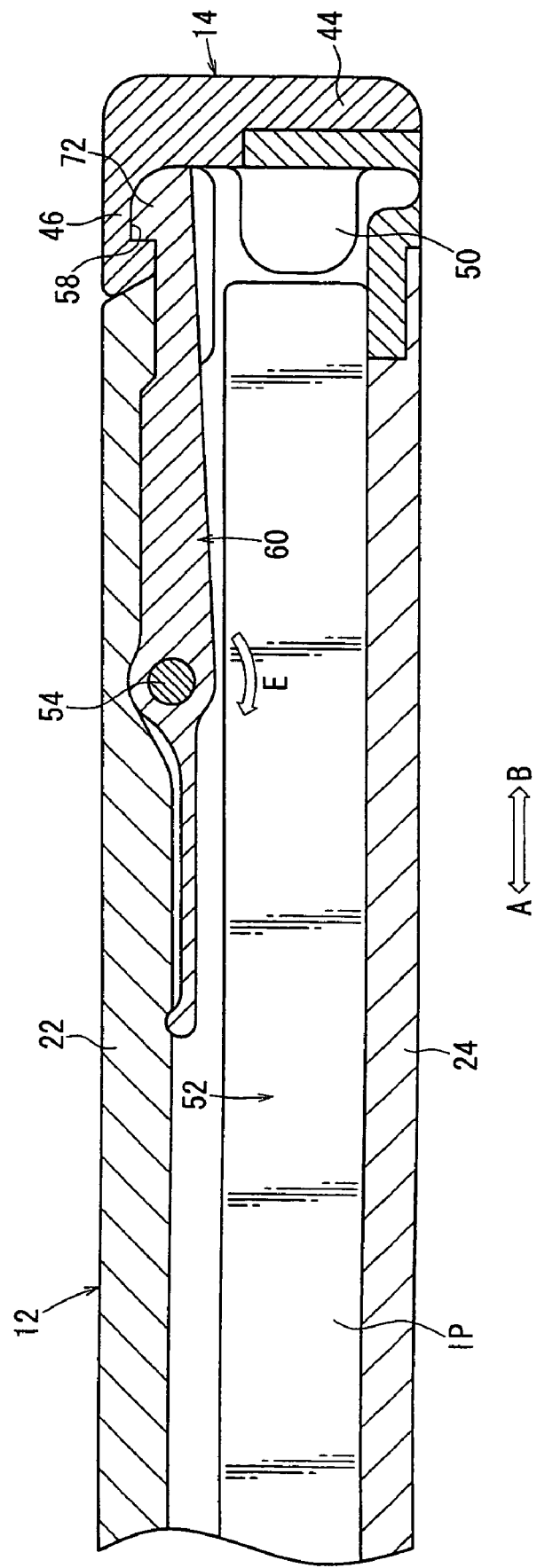
FIG. 6 is a cross-sectional view taken along line VI-VI of FIG. 2.

As shown in FIG. 6, each of the engagement plates 60 has a substantially central portion angularly movably supported on the shaft 54, an end extending in the direction indicated by the arrow A on the side of the housing 12 and held against an inner wall surface of the first casing 22, and an opposite end extending in the direction indicated by the arrow B on the side of the lid 14. The opposite end has a lock finger (first engagement member) 72 projecting toward the lip 46 of the lid 14 and held against an inner wall surface of the lip 46.

The lock finger 72 engages in the corresponding one of the engagement grooves 58 defined in the lip 46 of the lid 14. The engagement grooves 58 are positioned in confronting relation to the respective engagement plates 60 and are concavely defined to a predetermined depth in the inner wall surface of the lip 46. Each of the engagement grooves 58 has a width that is substantially equal to or slightly greater than the width of the engagement plate 60. When the lock finger 72 of the engagement plate 60 engages in the engagement groove 58, the lid 14 is locked against angular movement away from the open end of the housing 12 and keeps the housing 12 closed.

As shown in FIG. 2, when the engagement plate 60 is displaced by the shaft 54 in the direction indicated by the arrow D to a portion adjacent to the engagement groove 58 in the lid 14, the lock finger 72 of the engagement plate 60 is pushed toward the second casing 24 by an inner wall surface of the lip 46 at a portion free of the engagement groove 58. The engagement plate 60 is turned clockwise in the direction indicated by the arrow E about the shaft 54, thereby unlocking the lid 14. The lid 14 is angularly moved away from the open end of the housing 12, which is now opened.

Figure 7:
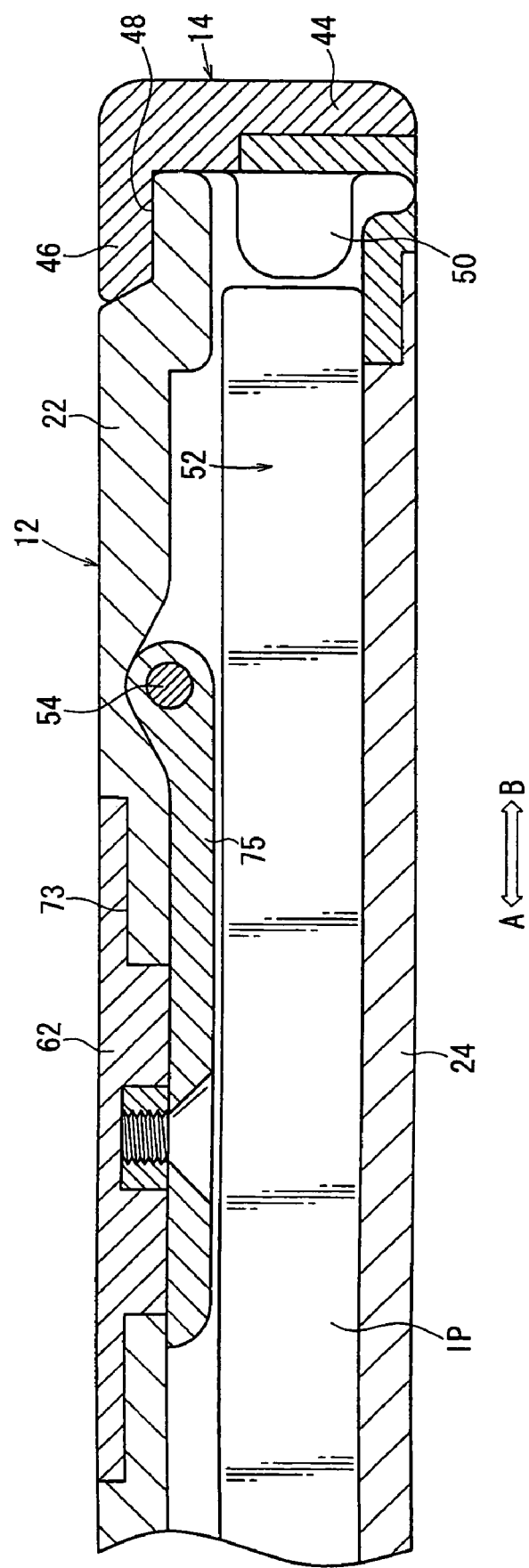
FIG. 7 is a cross-sectional view taken along line VII-VII of FIG. 2.

As shown in FIGS. 2 and 7, the unlocking member 62 is disposed on the first casing 22 at a position spaced a predetermined distance from the lid 14. The unlocking member 62 is placed in a mount hole 73 defined substantially transversely centrally in the first casing 22 and has an exposed outer surface. A joint plate 75 is fixed to an inner surface of the unlocking member 62 and disposed within the housing 12. The joint plate 75 extends to the shaft 54 in the direction indicated by the arrow B, and has an end coupled to the shaft 54.

The unlocking member 62 is displaceable along and within the mount hole 73 in unison with the shaft 54 in the axial directions of the shaft 54.

A spring (not shown) is interposed between the unlocking member 62 and an end of the mount hole 73 for normally biasing the unlocking member 62 to move toward the presser 64 in the direction indicated by the arrow C under the resiliency of the spring. Stated otherwise, the unlocking member 62, the shaft 54, the engagement plates 60 and the presser 64 which are fixed to the shaft 54 are normally urged to move toward the first hole 68 in the direction indicated by the arrow C under the resiliency of the spring.

Rather than pushing the first pressing member 66 of the presser 64, the operator may manually slide the unlocking member 62 in the direction indicated by the arrow D away from the first hole 68 against the bias of the spring. When the unlocking member 62 is thus moved, the engagement plates 60 are displaced in the direction indicated by the arrow D in unison with the shaft 54, unlocking the lid 14. Therefore, the opening/closing lock mechanism 16 may unlock the lid 14 either when the presser 64 is pressed or when the unlocking member 62 mounted on the first casing 22 is displaced.

When the presser 64 is released after it has been pushed or when the unlocking member 62 is released after it has been displaced, the shaft 54 coupled to the presser 64 and the unlocking member 62 is automatically displaced toward the first hole 68 in the direction indicated by the arrow C under the bias of the spring, returning the engagement plates 60 to respective positions facing the engagement grooves 58 in the lid 14.

As shown in FIG. 8, the lock mechanism 18 includes a lock arm (angularly movable member) 74 disposed in the housing 12 for engagement with the plate member 52. The lock arm 74 is disposed between the plate member 52 including the stimulable phosphor sheet IP and the inner wall surface of the housing 12. The lock arm 74 has a substantially central portion pivotally supported by a support shaft 76 which is supported by the first and second casings 22, 24. The lock arm 74 is angularly movable about the shaft 76 while lying substantially parallel to the planes of the first and second casings 22, 24.

The lock arm 74 has a flat end portion 74a for abutting engagement with a side surface of the plate member 52. The flat end portion 74a includes an engagement member (second engagement member) 78 projecting toward the plate member 52. The lock arm 74 also has a spring 80 disposed remotely from the engagement member 78 and abutting against the inner wall surface of the housing 12.

The spring 80 is of a substantially U-shaped cross section for applying a resilient force to normally bias the end portion 74a of the lock arm 74 to move in the direction indicated by the arrow D in FIG. 8 away from the inner wall surface of the housing 12, thereby pressing the engagement member 78 toward the plate member 52 at all times. Under the bias of the spring 80, the engagement member 78 engages in an engagement recess (recess) 82 defined in a side surface of the plate member 52 for thereby locking the plate member 52 against displaced toward the lid 14 in the direction indicated by the arrow B, i.e., locking the plate member 52 as being fixed to the housing 12.

The lock arm 74 has an opposite flat end portion 74b for abutting engagement with the inner wall surface of the housing 12. The flat end portion 74b includes a second pressing member 84 projecting a predetermined distance toward the side surface of the housing 12. The second pressing member 84 is of a substantially elongate rectangular cross section and is inserted in a second hole 86 defined in the side surface of the housing 12. The second pressing member 84 has an outer end face which lies substantially flush with the side surface of the housing 12, rather than projecting from the side surface of the housing 12, when the second pressing member 84 is fully inserted in the second hole 86.

When the second pressing member 84 is pressed into the housing 12 by a force applied from outside the housing 12, the lock arm 74 is turned clockwise in the direction indicated by the arrow F about the support shaft 76 until the engagement member 78 of the lock arm 74 is displaced out of the engagement recess 82. As a result, the lock arm 74 unlocks the plate member 52 to allow the plate member 52 to be displaced with respect to the housing 12.

The pusher mechanisms 20 are disposed on the end of the housing 12 where the holder 27 is mounted, and are positioned between the plate member 52 and the opposite side surfaces of the housing 12.

As shown in FIGS. 2 and 4, each of the pusher mechanisms 20 comprises a bracket 88 engaging the end of the plate member 52, a displacement block 90 coupled to the bracket 88 and disposed displaceably between the plate member 52 and the inner wall surface of the housing 12, and a spring 92 for normally urging the displacement block 90 to move toward the lid 14 in the direction indicated by the arrow B.

The bracket 88 is of a substantially triangular cross section and is disposed between the plate member 52 and the first casing 22. The bracket 88 has a hook 94 on an end thereof which is bent perpendicularly toward the second casing 24. The hook 94 engages an end face of the plate member 52 which faces the holder 27.

The displacement block 90 has an oblong hole 96 defined in an end portion thereof on the side of the lid 14. The oblong hole 96 receives therein a pin 34 fixed to the second casing 24. The displacement block 90 is limited in its axial displacement by the pin 34, and can be displaced only a distance corresponding to the axial length of the oblong hole 96.

The bracket 88 is integrally mounted on the displacement block 90 at an opposite end thereof on the side of the first casing 22. The bracket 88 is displaceable in unison with the displacement block 90.

The displacement block 90 has a recess 100 defined substantially centrally therein and extending axially thereof. The recess 100 is open toward the second casing 24. The recess 100 houses therein a spring 92 interposed between an inner wall surface of the recess 100 and a vertical wall 102 of the second casing 24. The displacement block 90 is normally biased to move toward the lid 14 in the direction indicated by the arrow B under the resiliency of the spring 92. The bracket 88 and the plate member 52 including the stimulable phosphor sheet IP are thus normally pressed toward the lid 14 by the displacement block 90.

The cassette 10 according to the present embodiment is basically constructed as described above. Removal of the stimulable phosphor sheet IP from the cassette 10 and storage of the stimulable phosphor sheet IP into the cassette 10 will be described below.

It is assumed that the cassette 10 is inserted into a cassette insertion slot of an image reading apparatus, not shown, and loaded therein with the lid 14 oriented downwardly. At this time, the lid 14 is held in closing relation to the open end of the housing 12 by the opening/closing lock mechanism 16, and the plate member 52 including the stimulable phosphor sheet IP is locked in the housing 12 by the lock mechanism 18. Therefore, the plate member 52 is prevented from being ejected out of the housing 12.

For removing the stimulable phosphor sheet IP from the cassette 10, the pressing mechanism (not shown) in the image reading apparatus presses the first pressing member 66 on the side surface of the housing 12 so that the presser 64 is displaced toward the center of the housing 12. The shaft 54 is axially displaced to release the engagement plates 60 out of the respective engagement grooves 58. As a result, the lock fingers 72 of the engagement plates are disengaged from the engagement grooves 58, unlocking the lid 14.

Figure 9A:
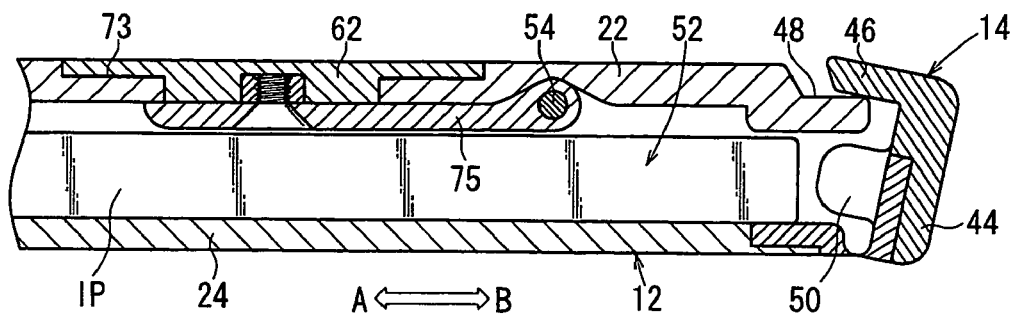
FIGS. 9A through 9C are enlarged fragmentary vertical cross-sectional views showing the manner in which a plate member including a stimulable phosphor sheet stored in a housing is displaced toward a lid and removed out of the housing.

The lid 14 is slightly turned downwardly by gravity about the junction where the lid 14 and the second casing 24 are joined to each other (see FIG. 9A). Since the lid 14 is turned by gravity, the lid 14 is turned only slightly, opening the housing 12 only slightly. At this time, the housing 12 that has been closed by the lid 14 is not opened widely enough to allow the plate member 52 to be removed out of the housing 12 through the open end thereof.

Then, the second pressing member 84 which faces the side surface of the housing 12 is pressed by the pressing mechanism (not shown), turning the lock arm 74 with the second pressing member 84 counterclockwise in the direction indicated by the arrow G in FIG. 8 about the support shaft 76. The end portion 74a of the lock arm 74 is turned toward the inner wall surface of the housing 12 against the bias of the spring 80 that is held against the inner wall surface of the housing 12. The engagement member 78 of the lock arm 74 disengages from the engagement recess 82 in the plate member 52, releasing the plate member 52. The plate member 52 is now made displaceable in the housing 12 toward the lid 14 in the direction indicated by the arrow B.

The plate member 52 is then displaced by gravity toward the lid 14 in the direction indicated by the arrow B, and is also pushed toward the lid 14 by the pusher mechanisms 20 at the end of the housing 12. Specifically, the brackets 88 of the pusher mechanisms 20 are displaced toward the lid 14 by the displacement blocks 90 under the bias of the springs 92, so that the end face of the plate member 52 which is engaged by the hooks 94 of the brackets 88 is pushed toward the lid 14 in the direction indicated by the arrow B.

Figure 9B:
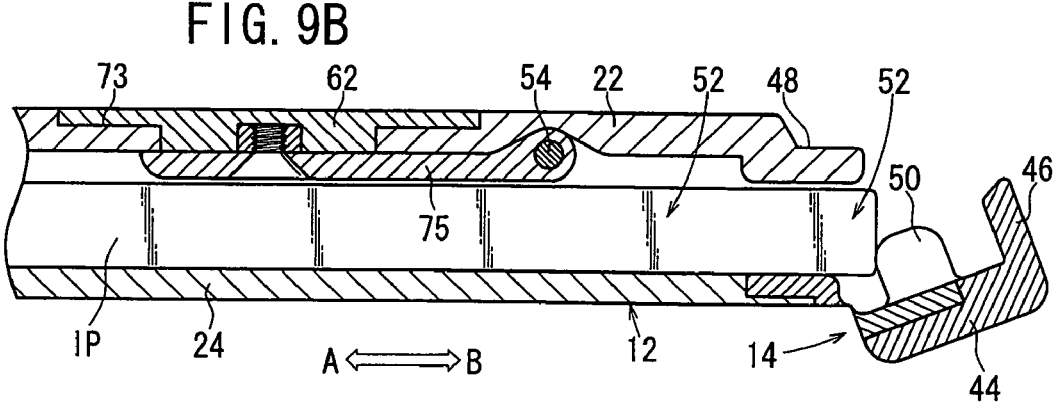
Figure 9C:
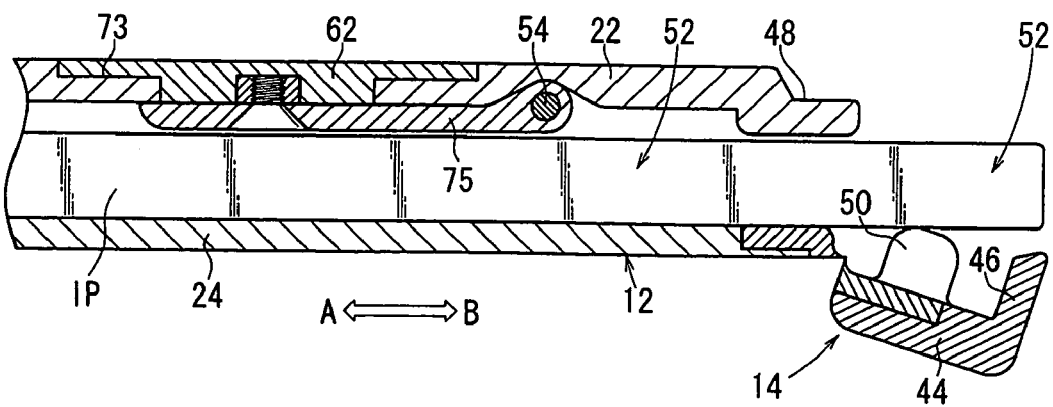

The plate member 52 is displaced toward the lid 14 until the end of the plate member 52 is brought into abutment against the boss 50 of the lid 14 which faces the end of the plate member 52 (see FIG. 9B). The lid 14 is turned angularly moved by being pushed by the plate member 52 until the base 44 of the lid 14 extends substantially parallel to the second casing 24. The lid 14 is thus opened to an angular position that is substantially at a right angle to the angular position thereof in which it closes the housing 12, allowing the plate member 52 including the stimulable phosphor sheet IP to be removed out of the housing 12 (see FIG. 9C).

The stimulable phosphor sheet IP is fed by a feed unit in the image reading apparatus to a reading unit, which photoelectrically reads radiation image information recorded in the stimulable phosphor sheet IP. Thereafter, the stimulable phosphor sheet IP is fed again by the feed unit to an erasing unit having a plurality of erasing light sources. The erasing light sources are energized to emit erasing light to erase remaining radiation image information from the stimulable phosphor sheet IP.

After the recorded radiation image information has been read from the stimulable phosphor sheet IP and the remaining radiation image information has been erased from the stimulable phosphor sheet IP, the stimulable phosphor sheet IP is stored back into the housing 12 by the feed unit.

When the plate member 52 including the stimulable phosphor sheet IP is inserted into the housing 12 with the lid 14 being open, the end of the plate member 52 is engaged by the hooks 94 of the pusher mechanisms 20. The plate member 52 is stored in the housing 12 while pushing the brackets 88 in the direction indicated by the arrow A away from the lid 14 against the bias of the spring 92.

The lock arm 74 of the lock mechanism 18 has its engagement member 78 normally pressed toward the plate member 52 in the direction indicated by the arrow D under the bias of the spring 80 on the end portion 74a. Therefore, when the plate member 52 is displaced to a position where the engagement recess 82 faces the engagement member 78, the lock arm 74 is turned to insert the engagement member 78 into the engagement recess 82. The plate member 52 is now locked in the housing 12 against displacement back toward the lid 14 in the direction indicated by the arrow B and hence against being ejected out of the housing 12. Stated otherwise, the plate member 52 is reliably retained in the housing 12.

Finally, the lid 14 is turned toward the housing 12 about their junction by a robot (not shown) in the image reading apparatus. The engagement plates 60 of the opening/closing lock mechanism 16 are brought into engagement in the engagement grooves 58 of the lid 14 under the resiliency of the non-illustrated spring. The lid 14 is now locked in closing relation to the open end of the housing 12.

According to the present embodiment, as described above, the lid 14 for removing the stimulable phosphor sheet IP stored in the housing 12 of the cassette 10 is mounted on the end of the housing 12, and can be opened by being angularly moved with respect to the end of the second casing 24 of the housing 12. The opening area of the open end of the housing 12 is smaller than the opening area of conventional cassettes, and hence the housing 12 has a higher level of mechanical strength or rigidity. The first and second casings 22, 24 of the housing 12 can be formed by molding.

The first and second casings 22, 24 can easily be assembled together simply when the first and second casings 22, 24 are superposed one on the other and the arms 28 of the first casing 22 are brought into engagement with the engagement blocks 30 of the second casing 24. In addition, the ends of the first and second casings 22, 24 remote from the lid 14 are integrally coupled to each other by the holder 27, and the other ends of the first and second casings 22, 24 are connected to each other when they are closed by the lid 14 that is integral with the second casing 24. Consequently, the first and second casings 22, 24 can easily be assembled into the housing 12 by the holder 27 and the assembling mechanism 26, and the housing 12 can easily be disassembled for maintenance.

Since the cassette 10 has the lock mechanism 18 for locking the plate member 52 including the stimulable phosphor sheet IP against displacement out of the housing 12, even if the lid 14 is accidentally opened for some reasons, the plate member 52 is reliably retained in the housing 12 by the lock mechanism 18 and hence is reliably prevented from being ejected out of the housing 12.

The opening/closing lock mechanism 16 for locking the lid 14 against opening and closing movement can easily unlock the lid 14 simply when the first pressing member 66 on the side surface of the housing 12 is pressed into the housing 12. Therefore, the cassette 10 is simpler in structure than conventional cassettes where the lock mechanism is unlocked from the front face of the cassette through which the stimulable phosphor sheet is to be removed.

Furthermore, after the lid 14 has been unlocked by the opening/closing lock mechanism 16, the lid 14 can be opened under a pushing force (displacing force) applied by the plate member 52 including the stimulable phosphor sheet IP. The cassette 10 is thus structurally simple because it does not need a mechanism for opening the lid 14 widely enough to allow the stimulable phosphor sheet IP to be removed from the housing 12.

Although a certain preferred embodiment of the present invention has been shown and described in detail, it should be understood that various changes and modifications may be made therein without departing from the scope of the appended claims.

What is claimed is:

1. A cassette comprising:
    a box-shaped housing for storing a sheet-shaped workpiece therein;
    a lid mounted on an open end of said housing for opening and closing movement about a junction in which said lid is joined to said housing; and
    a lid lock mechanism for locking said lid in closing relation to the open end of said housing; and
    a switching mechanism mounted in said housing for switching between a fixed state in which said sheet shaped workpiece is fixedly disposed in said housing and a released state in which said sheet shaped workpiece is not fixed to said housing;
    wherein said switching mechanism is actuatable into said released state through the side surface of said housing which extends substantially perpendicularly to the direction in which said sheet shaped workpiece can be removed from said housing and
    wherein said lid lock mechanism is actuatable to unlock said lid through a side surface of said housing which extends substantially perpendicularly to a direction in which said sheet-shaped workpiece can be removed from said housing.

2. A cassette according to claim 1, wherein said lid lock mechanism comprises:
    a shaft disposed in said housing near said open end thereof and extending substantially centrally in a transverse direction which extends substantially perpendicularly to the direction in which said sheet shaped workpiece can be removed from said housing, said shaft being displaceable substantially perpendicularly to the direction in which said sheet shaped workpiece can be removed from said housing, and a first engagement member coupled to said shaft and removably engaging in a groove defined in said lid.

3. A cassette according to claim 2, wherein said lid lock mechanism comprises:
    a first pressing member mounted on an end of said shaft and exposed out of said housing;
    wherein said shaft and said first engagement member are axially displaced when said first pressing member is pressed.

4. A cassette according to claim 3, wherein said lid lock mechanism comprises:
    an operating member coupled to said shaft and has a portion exposed out of said housing.

5. A cassette according to claim 4, wherein said lid lock mechanism is actuatable to unlock said lid when at least one of said first pressing member and said operating member is displaced.

6. A cassette according to claim 1, wherein said switching mechanism comprises:
    an angularly movable member angularly movable about a support shaft supported in said housing;
    said angularly movable member having a second engagement member disposed on an end portion thereof for insertion into a recess defined in said workpiece, and a second pressing member on an opposite end portion thereof for being exposed out of the side surface of said housing.

7. A cassette according to claim 6, wherein said angularly movable member is angularly moved about said support shaft to release said second engagement member out of said recess when said second pressing member is pressed.

8. A cassette according to claim 7, wherein said angularly movable member has a spring for normally urging said second engagement member to move into said recess.

9. A cassette according to claim 5, wherein said lid has a boss disposed in a position facing said workpiece stored in said housing, said boss projecting toward said workpiece, and said workpiece abuts against said boss when said lid is to be opened.

10. A cassette according to claim 1, wherein said housing comprises:
    a pair of plates disposed in confronting relation to each other; and
    an assembling mechanism disposed between said plates for preventing said plates from being displaced away from each other.

11. A cassette according to claim 10, wherein said assembling mechanism comprises:
    a tooth disposed on one of said plates and projecting toward the other of said plates;
    a displacement member displaceable substantially parallel to the direction in which said sheet-like workpiece can be removed from said housing, said displacement member having a finger engageable with said tooth; and a spring interposed between said other plate and said displacement member for normally urging said displacement member to move toward said tooth.

12. A cassette according to claim 11, further comprising:

a holder mounted on respective ends of said plates and securing the ends of said plates to each other.

13. A cassette according to claim 10, further comprising:

a pusher mechanism mounted in said housing for pushing said workpiece toward said lid.

14. A cassette according to claim 13, wherein said pusher mechanism comprises:

a displacement block having a bracket engaging an end of said workpiece; and a spring interposed between said displacement block and said housing for normally urging said displacement block to move toward said lid.

15. A cassette according to claim 13, wherein said workpiece comprises a radiation image recording medium for recording radiation image information of a subject therein.

\* \* \* \* \*